US007116356B2

(12) United States Patent
Peeples

(10) Patent No.: US 7,116,356 B2
(45) Date of Patent: Oct. 3, 2006

(54) VERTICALLY SELF-ALIGNING CAMERA MOUNT APPARATUS

(76) Inventor: Jason W. Peeples, 1696 Walterboro Hwy., Varnville, SC (US) 29944

( * ) Notice: Subject to any disclaimer, the term of this patent is extended or adjusted under 35 U.S.C. 154(b) by 716 days.

(21) Appl. No.: 10/222,470

(22) Filed: Aug. 15, 2002

(65) Prior Publication Data

US 2003/0048376 A1 Mar. 13, 2003

Related U.S. Application Data

(60) Provisional application No. 60/318,980, filed on Sep. 13, 2001.

(51) Int. Cl.

| | |
|---|---|
| ***H04N 5/225*** | (2006.01) |
| ***H04N 9/47*** | (2006.01) |
| ***A47F 5/00*** | (2006.01) |
| ***F16M 13/00*** | (2006.01) |
| ***F16B 7/00*** | (2006.01) |
| ***F16C 33/72*** | (2006.01) |

(52) U.S. Cl. ................. 348/207.99; 348/373; 348/151; 248/125.1; 248/580; 403/26; 384/94

(58) Field of Classification Search ..................... None
See application file for complete search history.

(56) References Cited

U.S. PATENT DOCUMENTS

| | | | | |
|---|---|---|---|---|
| 3,732,368 | A * | 5/1973 | Mahlab | 348/151 |
| 3,820,134 | A * | 6/1974 | Wilton et al. | 396/428 |
| 4,172,620 | A * | 10/1979 | Marti | 384/474 |
| 4,414,576 | A * | 11/1983 | Randmae | 348/373 |
| 4,474,439 | A * | 10/1984 | Brown | 348/373 |
| 4,572,594 | A * | 2/1986 | Schwartz | 348/373 |
| 4,625,938 | A * | 12/1986 | Brown | 248/550 |
| 4,916,550 | A * | 4/1990 | Miyake et al. | 348/373 |
| 4,943,019 | A * | 7/1990 | Mester | 248/124.1 |
| 5,259,628 | A * | 11/1993 | Nisley | 384/480 |
| 5,328,276 | A * | 7/1994 | Linteau | 384/477 |
| 6,115,068 | A * | 9/2000 | Ariga et al. | 348/373 |
| 6,450,706 | B1 * | 9/2002 | Chapman | 396/428 |
| 6,478,427 | B1 * | 11/2002 | Morris et al. | 248/123.11 |
| D474,488 | S * | 5/2003 | Arbuckle et al. | D16/203 |
| 6,705,773 | B1 * | 3/2004 | Fix | 396/419 |

FOREIGN PATENT DOCUMENTS

| | | |
|---|---|---|
| JP | 06-030315 | * 2/1994 |
| JP | 09-048584 | * 2/1997 |

* cited by examiner

*Primary Examiner*—David Ometz
*Assistant Examiner*—Nhan Tran
(74) *Attorney, Agent, or Firm*—Shephen R. Chapman

(57) ABSTRACT

A self-aligning apparatus comprising a ball bearing assembly mounted on a base plate and supporting an axle on which is mounted a video camera. In response to the force of gravity, the axle rotates such that the camera maintains a line-of-sight parallel to the cable of a crane or similar heavy equipment such that the video camera constantly views the work site of the hook element of the equipment. The equipment operator can view in real time images transmitted by the camera there reducing dependency on ground observers and improving safety.

4 Claims, 11 Drawing Sheets

VERTICALLY SELF-ALIGNING CAMERA MOUNT APPARATUS

This application claims priority of U.S. Provisional Patent Application No. 60/318,980 filed Sep. 13, 2001 by Jason W. Peeples.

FIELD OF THE INVENTION

This invention is directed towards a device to position a camera so as to allow operators of certain types of heavy construction equipment to view directly a potentially obscured work site. More specifically, it is an apparatus to continuously align a camera with the vertical axis of the cable element of a crane with the view directed to the hook element on the cable, thereby allowing the operator to view directly the position of the hook in relation to a load and the surrounding work site when it might otherwise be out of the operator's line-of-sight. A further purpose of the invention is recording a real time record of the operation of a crane for safety records.

BACKGROUND OF THE INVENTION

Cranes are used to lift, move, and position loads of over 300 mT. To avoid injury to workers and damage to both the load being moved and other structures and equipment, operators depend on observers to signal how, when, and where to move loads.

Two major elements of a crane, in addition to the power source, are the boom and cable. The boom is attached at its base to a platform and is capable of being raised by elevating the opposite end, by increasing the angle between the boom and the platform. The length of the boom and the angle to which it can be elevated determine the height to which the crane can lift a load within its design capacity. A heavy extendable/retractable cable is supported by the boom and actually connects the load to the boom by means of a hook or other device. The boom and integrated cable, supports, and pulleys are connected to base, or platform that includes the operator's station. The base of many cranes is rotatable, frequently in a full circle.

The cable and hook extend from the distal end of the boom, and in response to gravity unless physically prevented, the cable assumes an attitude vertical to the earth's surface. It is important to position the boom such that the cable is directly over a load so that the cable is at right angles to minimize potential harm arising from dragging the load.

If a load is not directly under the distal end of the boom, as the load is lifted, the load may be damaged by dragging as gravity forces the cable to its natural vertical position. As the load is lifted, the load may swing, potentially damaging its surroundings or injuring workers. Uncontrolled movement of the load may also damage the crane itself. Similarly, it is important to visually follow the load as it is moved and unloaded or disconnected from the cable.

Safety of operation of the lifting equipment depends to a significant extent on the Operator's view of the work site; the point a which a load will be connected and lifted, the path through the load will be moved by the boom, and the point at which the load will be delivered and the position in which it is to be placed.

Because of obstructions and similar conditions, crane operators frequently cannot directly view the site at which a load is to be picked-up, deposited, or the entire area through which the load is to be moved. As a result operators frequently dependent upon ground observers, or flagmen to indicate by common hand signals the location of the hook relevant to the load so that the hook can be properly connected to the load. Hand signals are used to guide the movement of the load and to position the load properly at its destination point. Delays in the flagman finding an appropriate position from which to signal, delays in signaling, misunderstandings in visual or oral communications may delay moving construction activities, may result in damage to the material to be moved or to structures adjacent, or most seriously, incorrect, misinterpreted, or delayed signals can result in serious injuries to the flagman, or to other workers. Accordingly, there remains room for variation and improvement in the art related to safety of certain construction equipment.

SUMMARY OF THE INVENTION

A purpose of the invention is a vertically self-aligning apparatus that responds to changes in the angle of elevation of the boom of a crane so as to maintain the field of vision of a camera mounted on the apparatus, in a constant, vertical plane parallel to the cable of the boom providing a view of the work site and hook element of the crane. The invention includes a video monitor with video recording capabilities to preserve images transmitted by the video camera. An axle is rotatably connected by its proximal end to a ball bearing assembly, and the ball bearing assembly is attached to a base plate. The base plate connects the entire apparatus to the boom structure of a crane. The camera is enclosed in a box-like, frame structure and may be protected by a compressible material. The camera is positioned in the frame so as to have an unobstructed line-of-sight from the frame structure. The frame structure with the enclosed camera is physically attached to the distal end of the axle at a point above its center of gravity such that the line-of-sight of the camera is vertically downward, parallel to the crane's cable and includes the hook element of the cable. As the angle of elevation of the boom changes, the line-of-sight of the camera remains vertical to the earth's surface and parallel to the cable as a result of the axle in conjunction with the ball bearing assembly rotating in response to gravity, the response being a direct function of the location of the point of attachment of the frame structure and axle. Images are transmitted to a monitor convenient for viewing by the operator of the crane. The monitor may include means to record the transmitted images. The ability to view directly the cable, hook, and work-site reduces dependency on and inadequacies of ground observers, thereby reducing the danger of injuries and damage to materials and equipment and increasing the efficiency of operation of the equipment.

These and other features, aspects, and advantages of the present invention will become better understood with reference to the following figures, descriptions, and appended claims

DESCRIPTION OF PREFERRED EMBODIMENT

Reference now will be made to preferred embodiments, one or more examples of which are set forth below. The examples are provided by way of explanation of the invention, not as limitations of the invention. One skilled in the art will readily recognize that modifications and variations of the present invention can be made without departing from the scope and purpose of the invention. Specific features described for individual embodiments can be combined to yield additional embodiments; thus, it is intended that such combinations and modifications are within the scope of the appended claims and their equivalents. The following detailed description presents other objectives, features, and aspects of the present invention. One of ordinary skill in the art will recognize the present description of exemplary embodiments only, not as limiting broader aspects of the present invention that are embodied in the exemplary constructions.

EXAMPLE 1

In describing the various figures, the same reference numbers are used consistently to identify the same element, part, or aspect of the invention. Once described in relation to a figure, detailed descriptions of an element, part, or aspect of the invention are not repeated, although reference numbers may appear in several figures.

Figure 1:
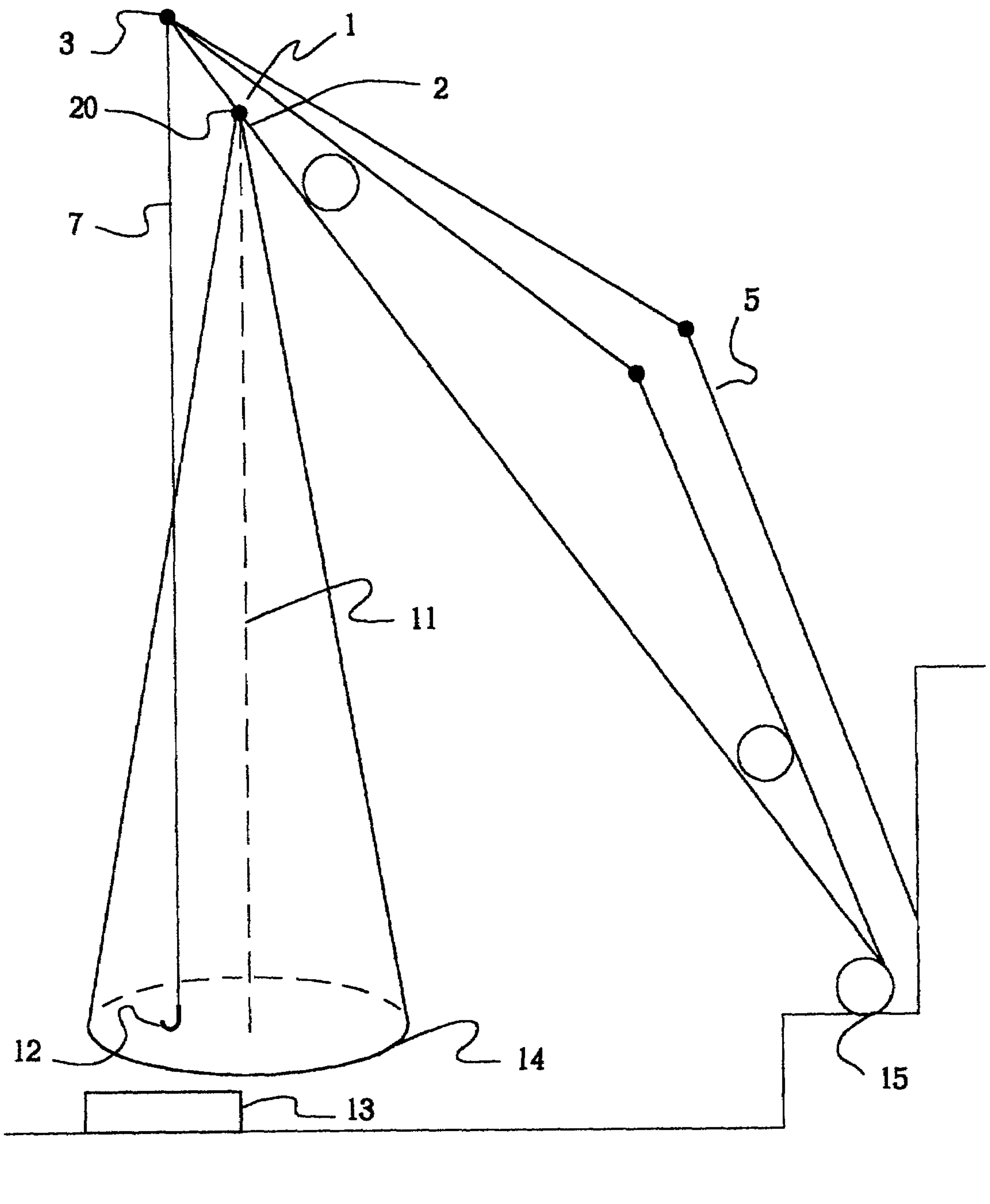
FIG. 1 illustrates on the boom of a crane in which the self-aligning apparatus may be located, the boom, cable, and camera line-of-sight.

As illustrated in FIG. 1, the self-aligning apparatus 1 is located 2 near the fly tip (proximal end) 3 of the boom 5. The cable 7 extends vertically downward from the fly tip 3 and extends from a heavy-duty take-up drum 15. The boom 5 and other unidentified elements support the cable and enable the angle of inclination of the boom to be changed. The self-aligning apparatus 1 is located 2 at or near the fly tip 3 and positioned to afford an unobstructed line-of-sight 11 downward from the apparatus. The line-of-sight 11 from a camera in the camera unit 20 is vertically downward and parallel to the cable 7. The field of vision 14 of a camera in the camera unit is centered in the line-of-sight 11 and is conical in geometry, such that it includes the hook 12 attached to the cable 7 and load 13. One of average skill in the art recognizes that for cranes equipped with a jib assembly, the distal end of the jib assembly would correspond to the fly tip of the boom.

Figure 2D:
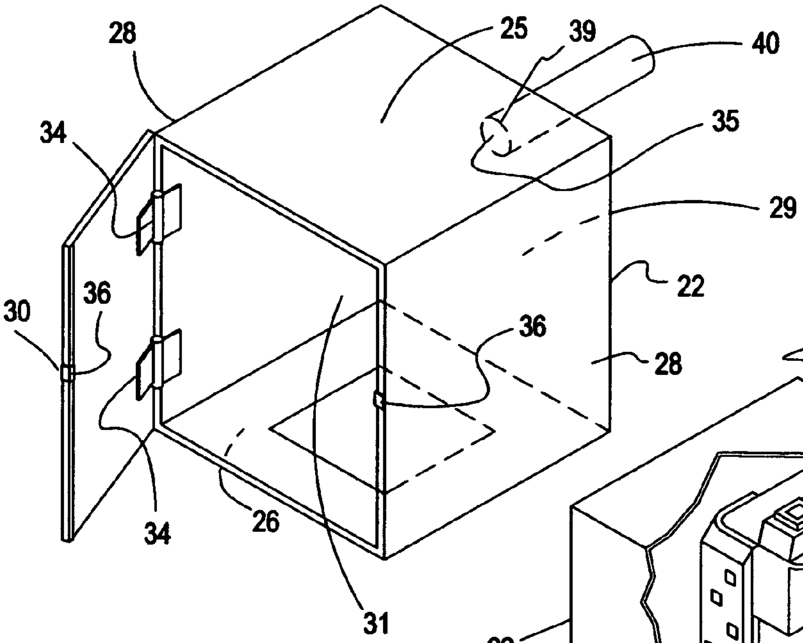
FIG. 2D provides detail of the camera frame structure.
Figure 2C:
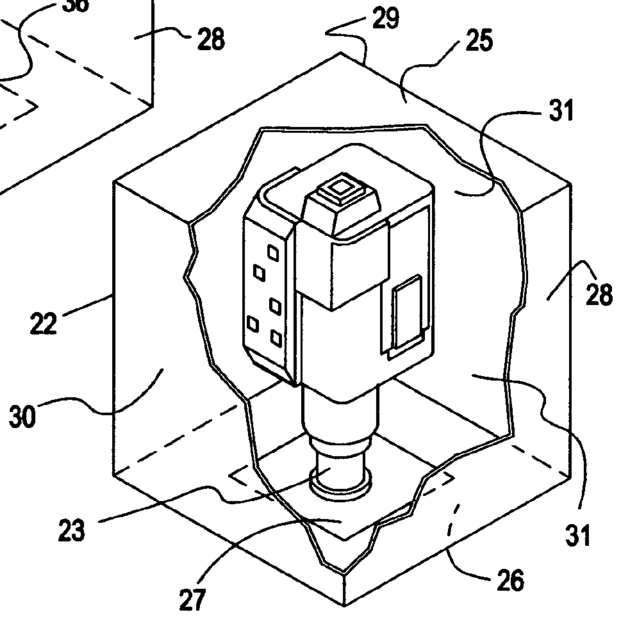
FIG. 2C provides detail of a camera positioned in the camera frame.
Figure 2A:
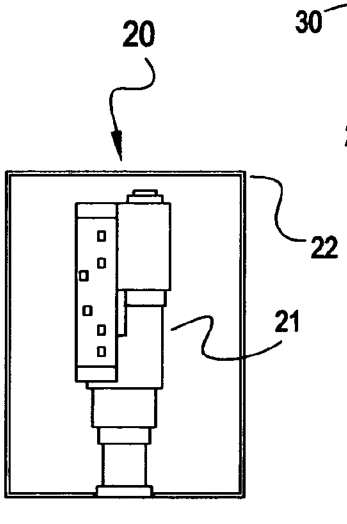
FIG. 2 A illustrates the basic camera unit including the frame structure and camera.
FIG. 2B illustrates the basic camera.

As illustrated by a cross section diagram, FIG. 2A, the camera unit 20 comprises two major elements: a video camera 21 and a frame structure 22. The video camera is an electrically powered instrument capable of transmitting images to a monitor. Cameras of this type and varying in complexity are commercially available. See for example B&H Photo-Video-ProAudio, 420 Ninth Ave., New York City, N.Y. 10001. The frame structure 22 is a box-like unit designed to encase and protect the video camera 21.

Figure 2B:
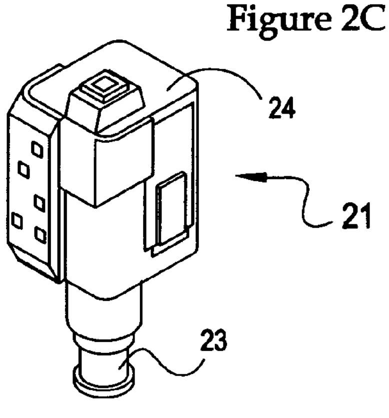

A wide variety of available video cameras may be adapted for this purpose. FIG. 2B illustrates diagrammatically minimum basic parts of the video camera 21. The two major parts are the camera lens system 23 and the camera body 24. One of average skill in the art understands technical aspects of a video camera, as well as its basic function and operation. Specific details as to size, shape, and weight of the camera are significant factors only to the extent that they must be known in order to fabricate an appropriate frame structure 22. The frame structure 22 supports the camera and provides the physical connection between the camera unit 20 and axle 40 as illustrated in FIG. 2D.

FIG. 2C illustrates details of the major parts and organization of the frame structure as they relate to these functions. The frame structure 22 comprises a box-like unit with a top piece 25, a bottom piece 26, the bottom piece 26 having an opening 27 located and positioned so that the camera lens 23 has an unobstructed line-of-sight from the frame structure 22. The frame structure further comprises sidepieces 28 a back piece 29, and a front piece 30 shown in FIG. 2D. The common edges of the top piece 25, side pieces 28, bottom piece 26, and back piece are securely joined as illustrated in FIG. 2C. The front piece 30 provides access to the interior 31 of the box-like unit and the video camera 21 enclosed therein. The front piece 30 contacts edges of the top piece 25, side pieces 28, and bottom piece 26 and is connected to these elements of the frame structure by hinges 34 positioned along one edge with a secure latch 36 on the opposite edge or by threaded fasteners joining the front piece 30 to the sides it contacts. A compressible material such as or sponge rubber covers and is adhesively bonded to the inner surfaces 31 of the top piece 25, the side pieces 28, the bottom piece 26, and the front piece 30. When the camera 21 is properly positioned in the frame structure 22, the lens 23 is centered in the opening 27 in the bottom piece 26.

When the front piece 30 is properly positioned and secured, the front 30 and back 29 pieces hold the camera in position. One skilled in the art will recognize that, depending on The shape of the camera, additional compressible material may be required to support the camera along any internal surface of the frame structure. Such additional padding does not alter the fundamental nature, scope, or intent of the invention. The frame structure may be fabricated from a wide variety of lightweight materials. Aluminum is a suitable material, but other metals, alloys, and synthetic materials are acceptable. As illustrated in FIG. 2C, the top, bottom, side, and front pieces are solid. The invention anticipates the use of strips of materials to fabricate each piece as an open center, frame-like rectangle without modifying the nature, scope, or intent of the invention.

FIG. 2D illustrates the camera unit 20 attached to the axle at a rotational point 35 on the back piece 29. The point is located vertically above the center of gravity of the camera unit and positioned horizontally such that, from any initial point with the axle 40 freely rotating, a line passing vertically through the lens 23 representing the center of the line-of-sight of the camera is vertical to the horizontal plane and will remain with this orientation in response to rotation of the axle 40 as the angle of elevation of the boom 5 of FIG. 1 is changed.

To determine the proper point of attachment of the axle to the camera unit, the center of gravity must be located with respect to the surface of the back piece 29 when the camera is positioned properly in the frame structure. The laws of physics define the center of gravity as the point at which the force of gravity is considered to act. The center of gravity can be determined analytically following laws well known in physics, but it is easier and more practical to determine this point experimentally. See for example, Giancoli, D.C., Physics Principles with Applications, 5th ed. Prentice Hall, Upper Saddle River, N.J. chapter 7, which chapter 7 is by reference herein incorporated in its entirety.

Experimentally, the center of gravity of an object is described as the intersection of two or more lines each of which passes from independent points on the surface of the object in a path vertical to the horizontal plane. If the center of gravity is on a line vertical to the horizontal plane and directly below a pivot point, the body will not rotate. If the line is not vertical to the horizontal plane, in the absence of mechanical interference, the object will rotate in response to the force of gravity until the vertical relationship is established. See for example Giancoli, D.C., Physics Principles with Applications, 5th ed. Prentice Hall, Upper Saddle River, N.J., which text is by reference herein incorporated in its entirety.

Figure 3B:
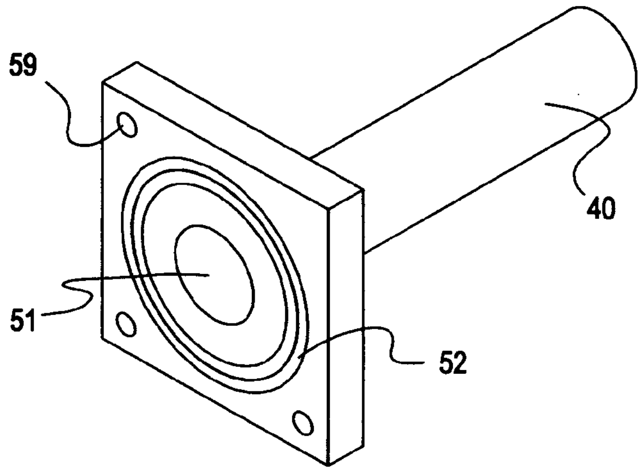
FIG. 3B provides details of a magnet positioned in the base plate to serve as a means of securing the base plate to the boom.
Figure 3A:
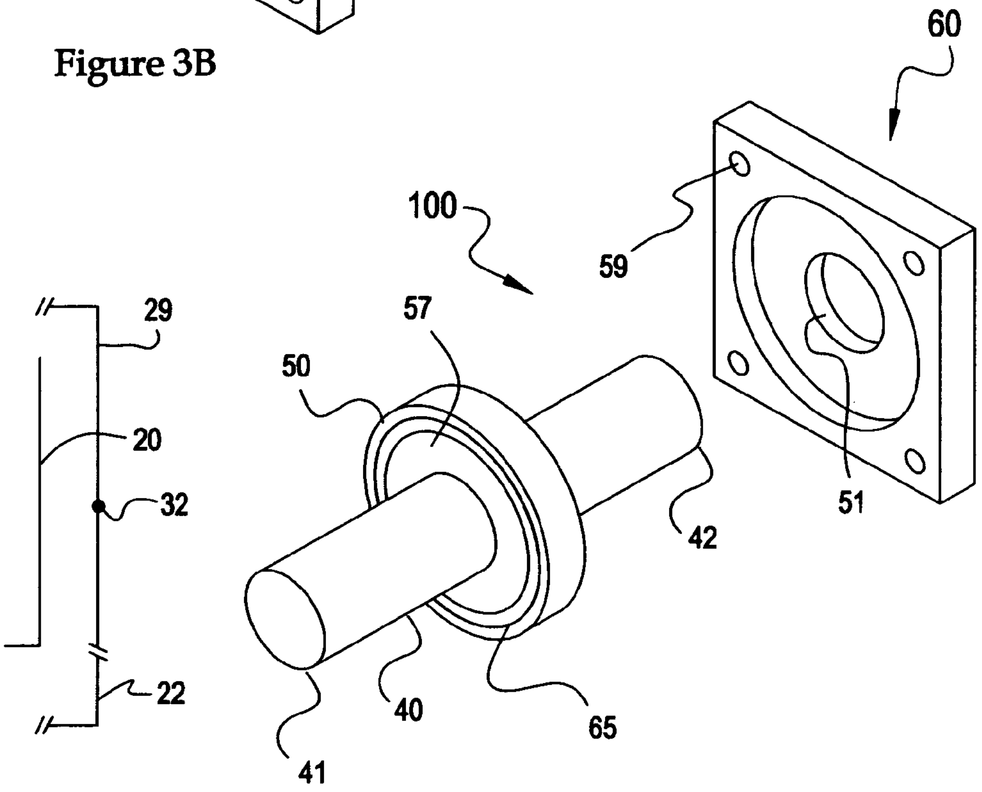
FIG. 3A provides several views of the device illustrating the relationship among major components including the camera unit, axle, bearing assembly, and base plate.

FIG. 3 illustrates the fundamental elements of the rotational unit 100 (base plate 60, axle 40, and sealed bearing assembly 50) and its relationship with respect to the camera unit 20. The proximal end 42 of an axle 40 is tightly pressed into the bore 52 of a sealed bearing assembly 50. A bearing hub receptacle 51 is machined into the base plate 60, and the sealed bearing assembly 50 including the axle 40 is tightly pressed into and held securely by the bearing hub receptacle 51. As illustrated in cross section FIG. 3B, the bearing hub receptacle 51 is shaped such that the sealed bearing assembly 50 cannot be forced through the bearing hub receptacle 51. One of average skill in the art understands how the sealed bearing assembly 50 is pressed onto the axle 40 and how the sealed bearing assembly with the axle in pressed into and held by the bearing hub receptacle 51.

The back face 59 of the base plate 60 is attached to the boom at a point 2 on the fly tip 3 as diagramed in FIG. 1. Various methods may be used to attach the base plate to the boom. Mechanical clamps well known in the art and magnets do not require manufacture approved installation; whereas welding or drilling and bolting through the boom structure to secure the base plate to the boom may require such special installation for safety of the boom structure. FIG. 3B illustrates the back side 59 of the base plate 60 with a magnet positioned in the back surface as a circular structure circumscribing the bore 52. The base plate may be machined or molded to receive the magnet, and the magnet may be held in position by a variety of means including bolts, rivets, or special adhesives.

The axle 40 rotates freely with the inner race 57 of the bearing assembly 50. The Outer race is held securely, positioned in the bearing hub receptacle 51 and does not rotate. The distal end 41 of the axle 40 is attached at a point 32 on the back face 29 of camera unit frame structure 22.

The base plate 60 is most commonly made of a metal, such as aluminum with a magnet 66 for mounting the base plate on the boom positioned in the back side 59 of the base plate 60. The shape is not limiting and can be modified for convenience to fit a specific point on a given boom. Specific dimensions are given as illustrations, not as limitations. Rectangles approximately 15 cm×15 cm are suitable. Minimum thickness of the base plate is determined by the minimum depth of the sealed bearing hub assembly 51, which in turn is determined by the width of the sealed bearing assembly. By way of illustration, not limitation, minimum depths of 0.5 cm to 1.5 cm are appropriate for bearing assemblies with corresponding thickness. These thickness are increased to allow positioning of a magnet as the desired means to attach the base plate to the boom of the crane.

Sealed bearing assemblies similar to those commonly used in the automotive industry are readily available from a variety of commercial sources. Dimensions of appropriate bearing assemblies for the preferred sealed bearing assembly, include, in addition to depth, outer diameter, which determines the diameter of the bearing hub receptacle and inner (bore) diameter. Dimensions of appropriate bearings in addition to width range by way of example from about approximately 1.00 cm to 5.00 cm bore diameter and 3.00 cm to 10.00 cm out side diameter. Suitable bearings are available through SKF, Chicago Rawhide, Elgin, Ill. 60123.

The axle is generally steel, although other materials are acceptable so long as they are adapted to having the sealed bearing assembly pressed on to them. The diameter is a function of the diameter of the bore of the sealed bearing assembly, assuming the axle is of adequate size to support the camera unit. Diameters range from 0.50 cm to 5.00 cm. The length of the axle varies from 10 cm to 100 cm. The major cause for variation is to allow the camera unit to be positioned with an unobstructed line-of-site on the boom. One skilled in the are recognizes that dimensions of the sealed bearing assembly and diameter of the axle increase as the weight of the camera unit increases and as the length of the axle increases. However acceptable dimensions can be determined without excessive experimentation.

An electric heating element 65 controlled by a thermostat (not shown) may be positioned around or against the sealed bearing 50 or optionally an electric heating element can be used to heat the entire base plate 60, including the sealed bearing. Such optional heating helps to ensure that low ambient temperatures do not increase the viscosity of the sealed bearing lubricant thereby inhibiting its free rotation and vertical alignment of the camera as the elevation of the boom changes.

Figure 4:
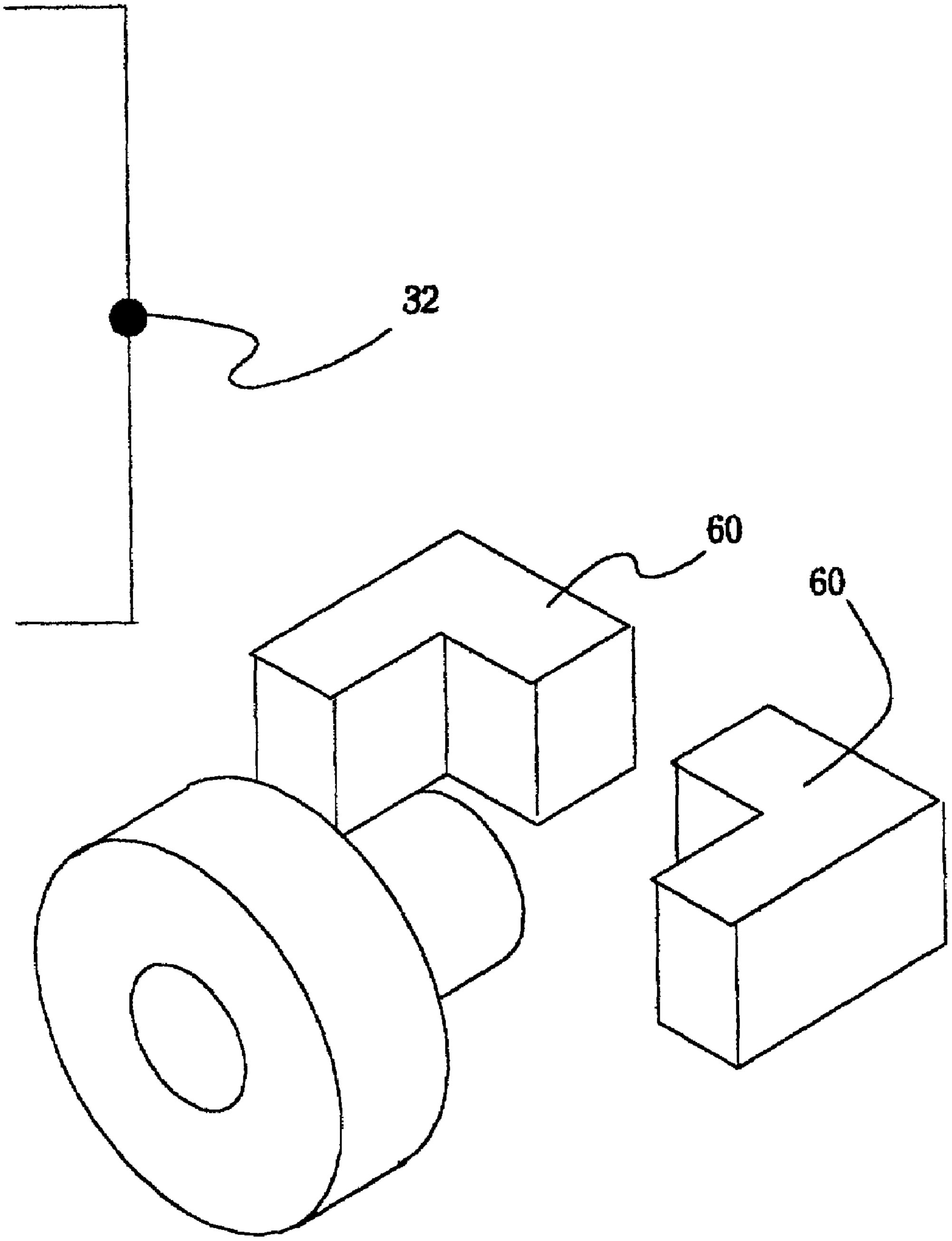
FIG. 4 provides details of an alternative base plate.

One skilled in the art recognizes that a sealed bearing assembly, although convenient is not essential. Other commercially available bearing assemblies are anticipated by the invention. In addition, one skilled in the art recognizes that the base plate 60 may be fabricated in two sections as shown in FIG. 4, a base and a bearing hub receptacle attached to the base, commonly by welding.

Because the axle rotates in conjunction with the bearing assembly, the point of attachment 39 of the axle 40 to the frame structure 22 constitutes the pivot point for the camera unit and for the camera that structure supports. For the camera constantly to face vertically downward, an appropriate point of attachment of the axle to the camera unit which point in practice is the back piece 29 of the frame structure at a point above the center of gravity on a line vertical to the horizontal plane when the line, if extended to the line-of-sight of the camera, would be the same as the line of sight of the camera.

Figure 5:
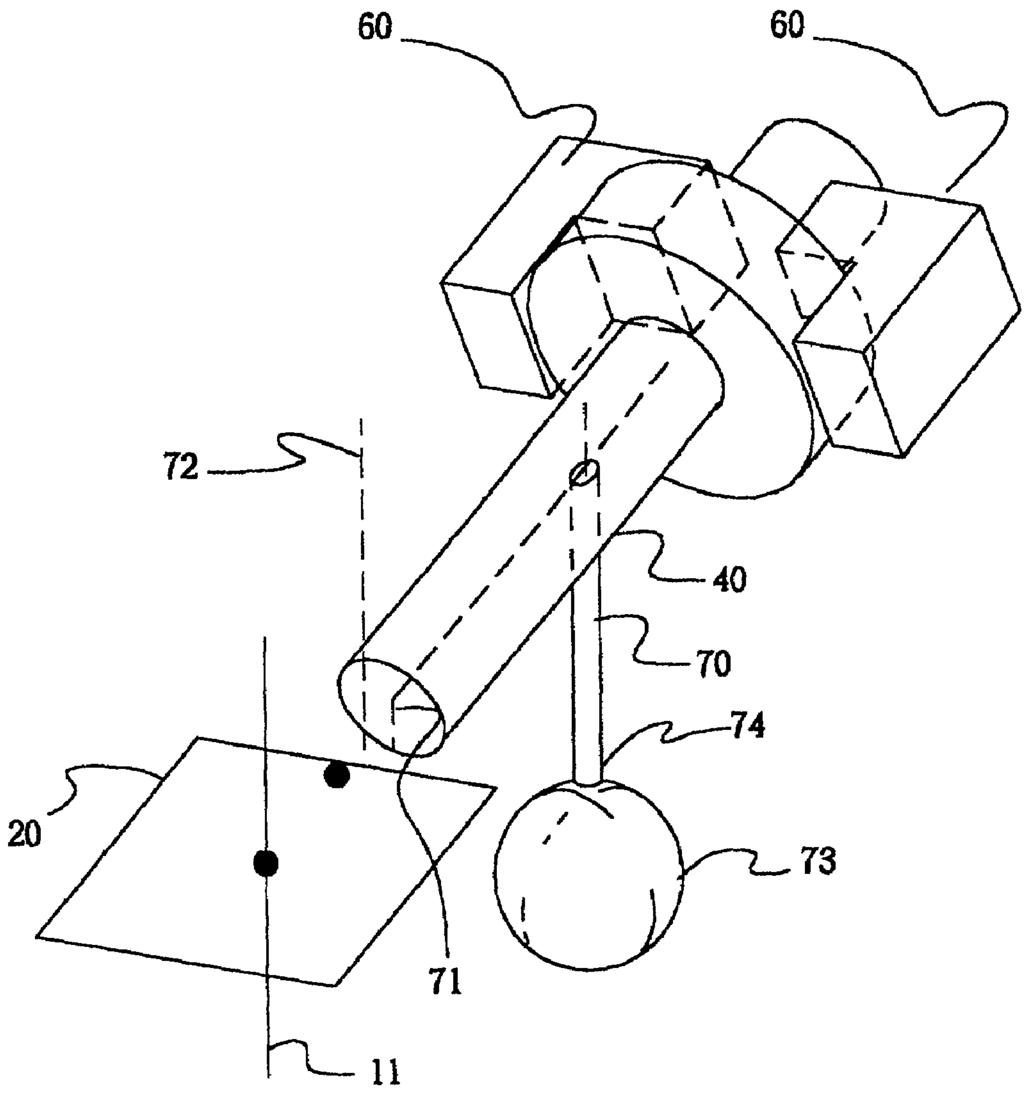
FIG. 5 illustrates a mechanical means to adjust the center of gravity of the camera unit.

FIG. 5 illustrates a mechanical means to effectively lower the center of gravity of the camera unit 20. A stud piece 70 is threaded into the axle 40 on a radius of the axle 71 such that the vertical centerline of the stud piece 72 is parallel to the line-of-sight 11 of the camera 21. One skilled in the art recognizes that this relationship is readily achieved by first positioning the stud piece 70 and then aligning the camera unit 20 and attaching it to the axle 40 as previously described. A weight 73 is threaded to the distal end 74 of the stud piece 70. The stud piece 70 and attached weight 74 act in a pendulum-like fashion causing the axle to rotate in response to the force of gravity as the elevation of the boom is changed. Given the vertically parallel planes of the camera line-of-sight and the stud piece and weight, the desired line-of-sight is assured and maintained.

Figure 6A:
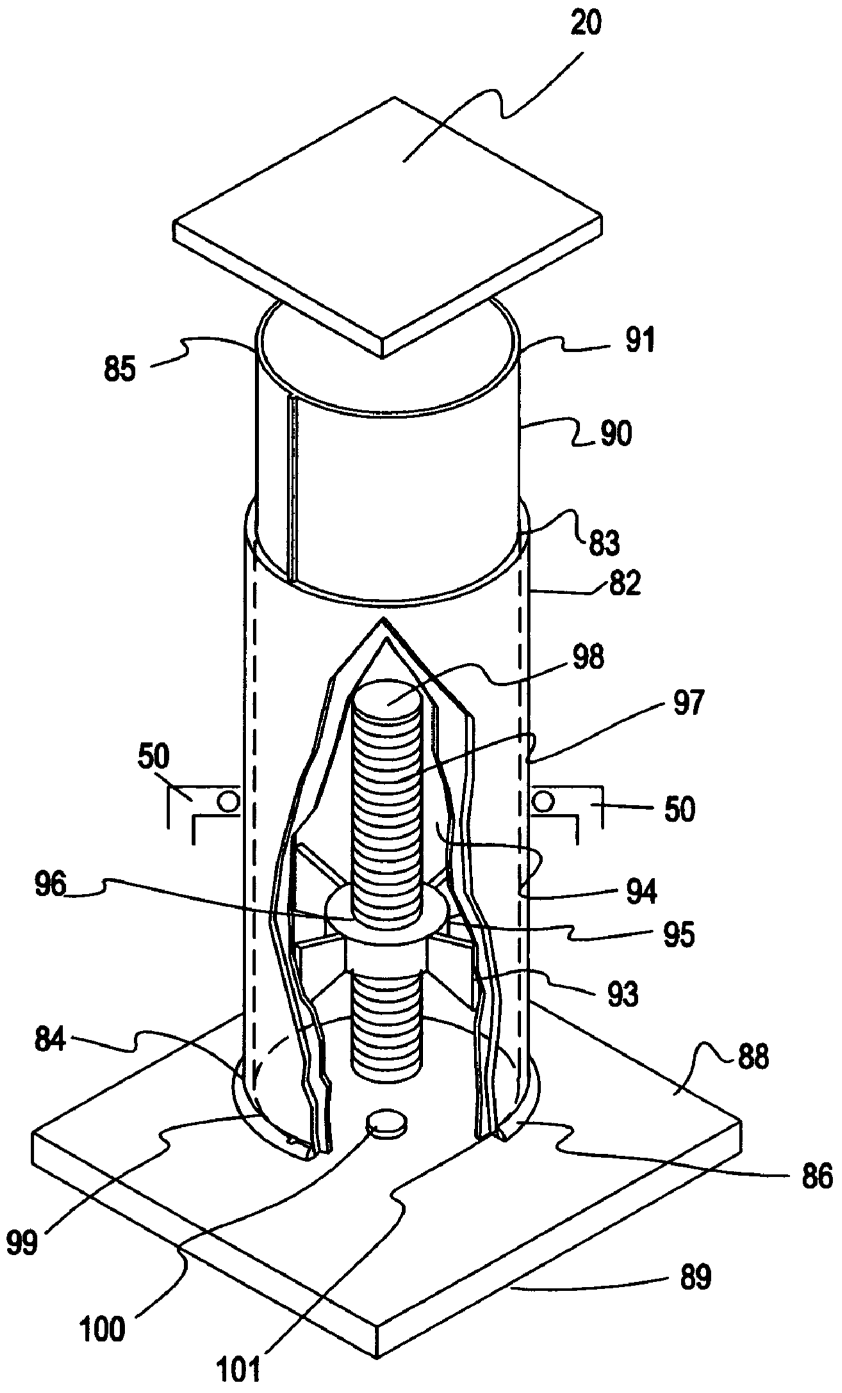
FIG. 6 illustrates a complex, multi-component, extendable axle with gear and power means to extend and retract an interior axle element.

FIG. 6 A illustrates a mechanically extendable axle unit 81 comprising an outer sleeve 82, longitudinally hollow element 83 with a proximal end 84 and a distal end 85. A flange 86 is formed at the proximal end 85.

The outer face 87 of the flange 86 contacts and is fixed to the face 88 of an electric motor 89. A longitudinally hollow inner sleeve 90 with a distal end 91 and a proximal end 92 is inserted into the outer sleeve 82. The camera unit 20 as previously described is attached to the distal end 91 of the inner sleeve 90.

A worm gear travel means 93 is attached near the proximal end 92 to, and centered in the longitudinal hollow core 94 of the inner sleeve 90. The worm gear travel means 93 comprises structural supports 94 and a nut structure 95 with a threaded aperture 96.

A threaded axle unit 97 with a distal end 98 and a proximal end 99 is threaded through the nut structure 95. The proximal end 99 is mechanically connected to the drive shaft 100 of the electric motor 88.

The outer sleeve 82 is pressed into the bearing assembly 50. The inner face 101 of the flange 86 contacts the bearing assembly 50 and limits the depth of insertion. The bearing assembly 50 with the inserted extendable axle unit 81 is pressed into the bearing hub receptacle 51 and secured by mechanical means, such as a pin or set screw.

Figure 6B:
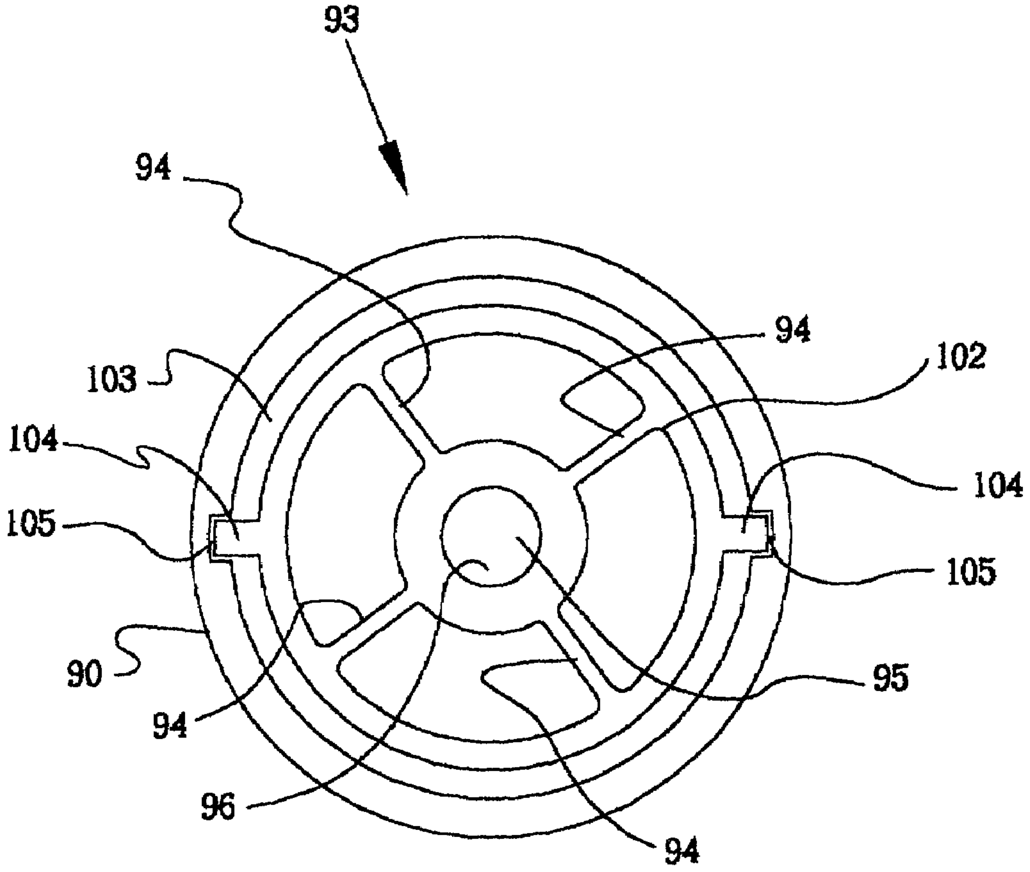

FIG. 6B provides details of the worm gear travel means 93, with four support elements 94 supporting the nut structure 95 with its threaded aperture 96. The support elements 94 are attached at points 102 on the inner surface of the inner sleeve such that the nut structure is centered in the longitudinally open core 103 of the inner sleeve 90. The camera unit 20 is attached at a point 32 to the distal end 91 of the inner sleeve 90.

The threaded axle unit 97 is directly coupled to and rotates with the drive shaft 100 of the electric motor 89. At least one key 104 is positioned longitudinally along the length of and fixed to the outer surface of the inner sleeve 90. The key 104 fits into a longitudinal groove 105 formed along the length of the inner surface of the outer sleeve.

The key 104 when positioned in the slot 105 prevents the inner sleeve from rotating with the threaded axle because the outer sleeve is anchored by the bearing assembly 50. Thus, when the threaded axle rotates with the motor drive shaft in one direction, the inner sleeve moves in one direction, and when the motor rotation is reversed, the inner sleeve moves in the opposite direction. The electric motor is reversible and controlled by a switch convenient to the equipment operator. Stop devices at each end of the threaded axle prevent over extension or retraction of the threaded axle. A pendulum device as described with respect to FIG. 5 may be positioned on the outer sleeve.

Figure 6C:
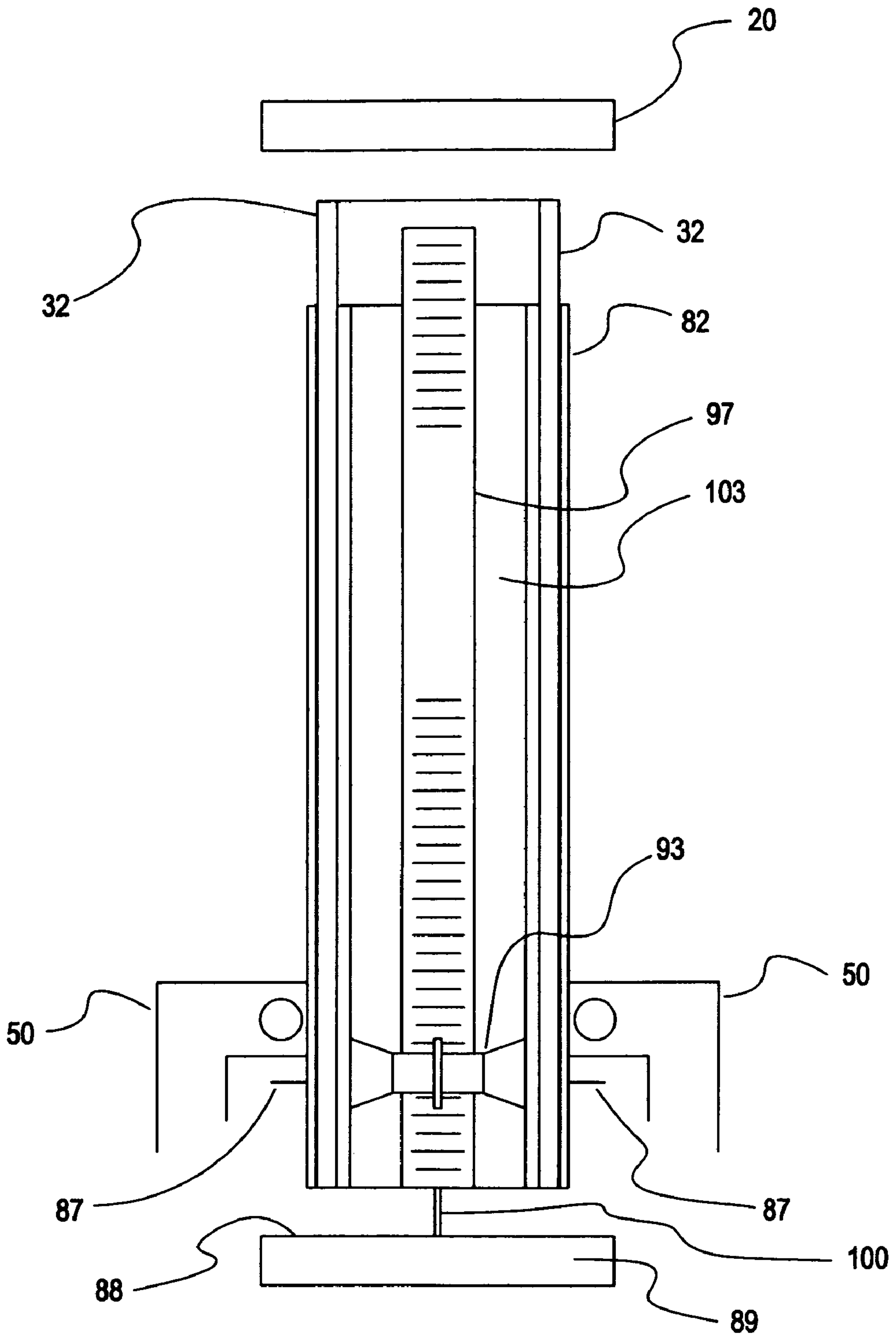

The relationships among certain major components of the extendable axle are summarized in FIG. 6C. The camera unit 20 is attached at a point 32 to the inner sleeve 90. The threaded axle 97 is coupled to the drive shaft 100 of a small, reversible electric motor 89. The outer sleeve 82 is connected by a flange face 87 to the motor to the gear assembly 50 by the opposite side of the flange.

Figure 7:
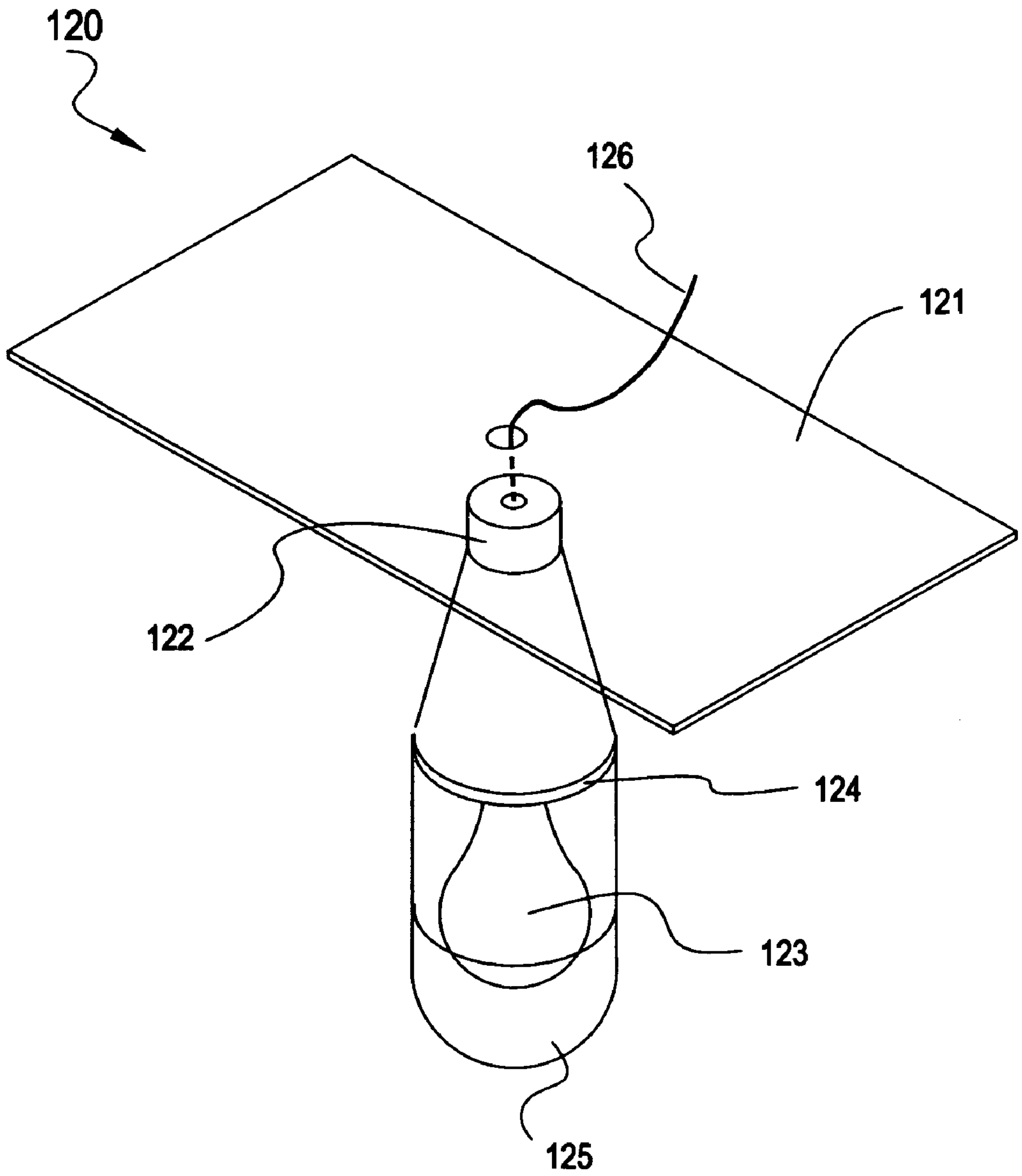
FIG. 7 illustrates an optional source of illumination of the work site to ensure at least minimal light for camera operation.

FIG. 7 illustrates a source of illumination 120 of the work site attached to the camera unit 20. As illustrated, the source of illumination is attached to the front surface of the camera unit. One skilled in the art recognizes that the source of illumination could be attached to other positions on the camera unit 20 without changing the scope of the invention. The point of attachment is below the center of gravity of the camera, or is compensated for by the stud piece 70 and weight 73 as described for FIG. 5. The source of illumination comprises at least a base plate 121 or means by which the source of illumination may be attached to the camera unit or otherwise to the device. A light receptacle 122 is attached to the base plate 121. The receptacle is threaded to receive and wired to permit the normal operation of a high intensity electric light bulb 123. The receptacle is appropriately insulated to prevent short circuits and related problems. The bulb 123 is encloses in a reflector unit 124 that includes a lens system 125 directs the light to the work site. The light is directed and focused along the same vertical plane as the line-of-sight of the camera. The receptacle 122 is electrically connected 126 to the power source of the equipment on which it is mounted.

EXAMPLE 2

Figure 8:
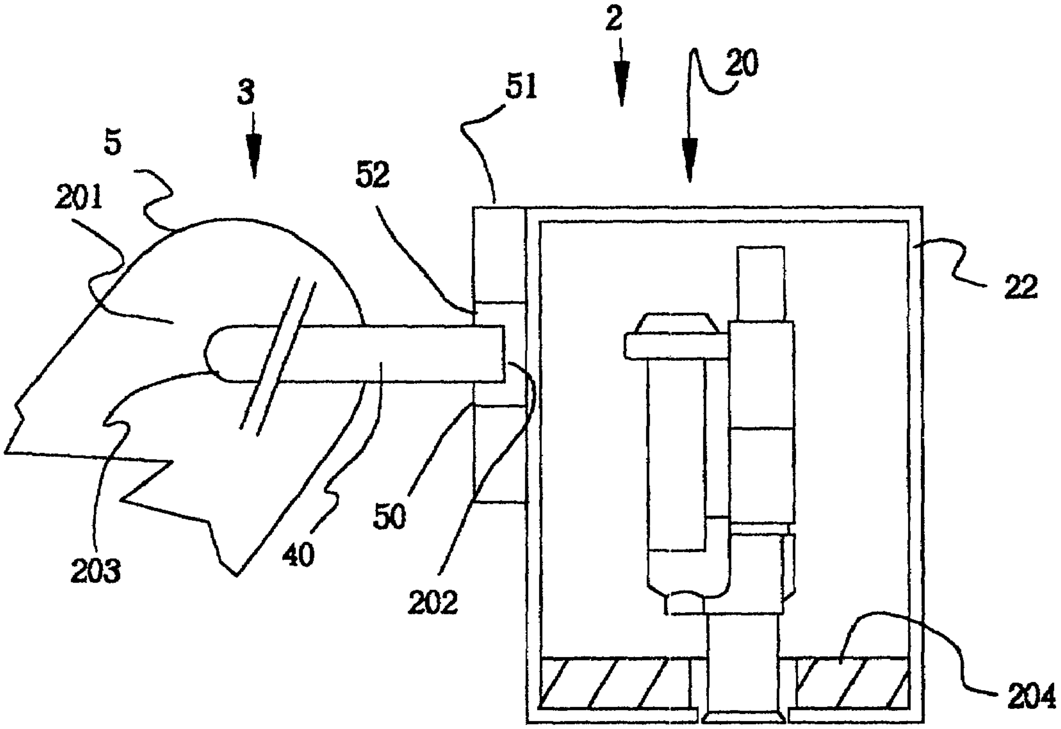
FIG. 8 illustrates a first alternative assembly of the apparatus.

FIG. 8 illustrates a first alternative arrangement of the rotatable parts of the apparatus 2. The distal end 203 of the axle 40 is firmly anchored to a point 201 on the boom 5 near the tip of the boom 3. The bearing hub receptacle 51 is attached to one side of the frame 22 and the sealed bearing assembly 50 is positioned as previously described. The proximal end 202 of the axle 40 is positioned in the bore 52. In this configuration, the axle is fixed and does not rotate, but the camera unit 20 rotates. To foster rotation additional weights 204 may be positioned in the base of the frame 22.

EXAMPLE 3

Figure 9A:
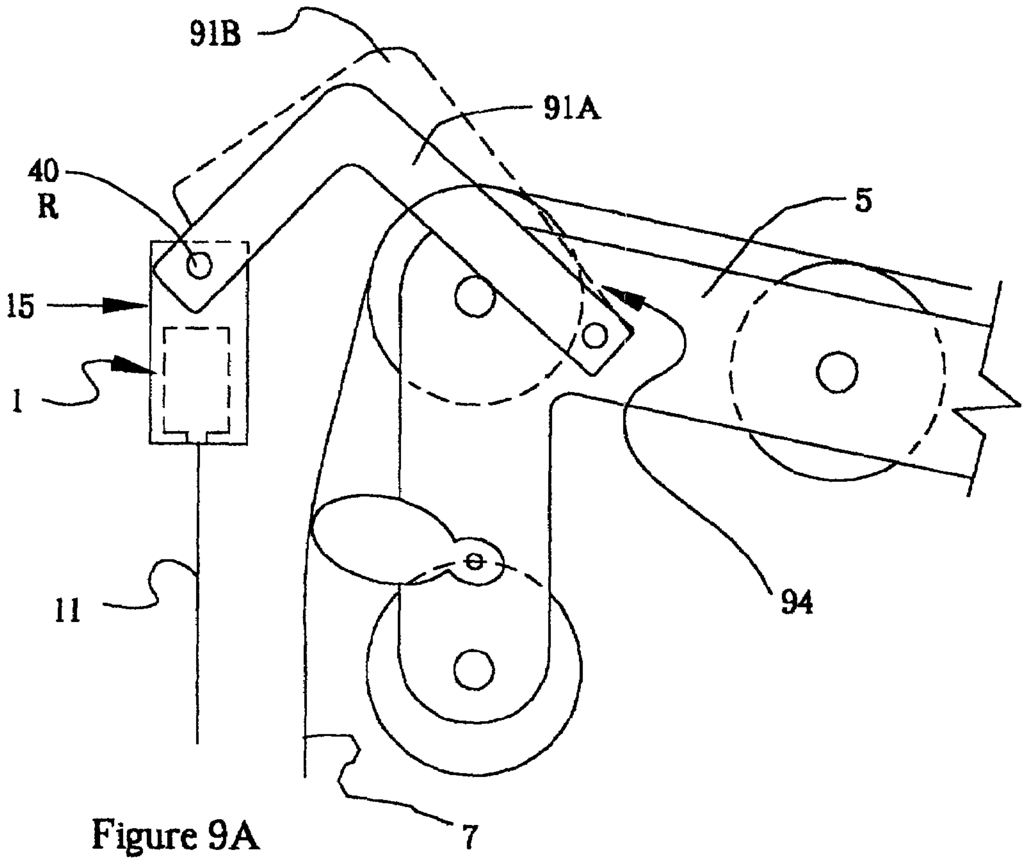
FIG. 9A illustrates a side view of a second alternative assembly of the apparatus.
Figure 9B:
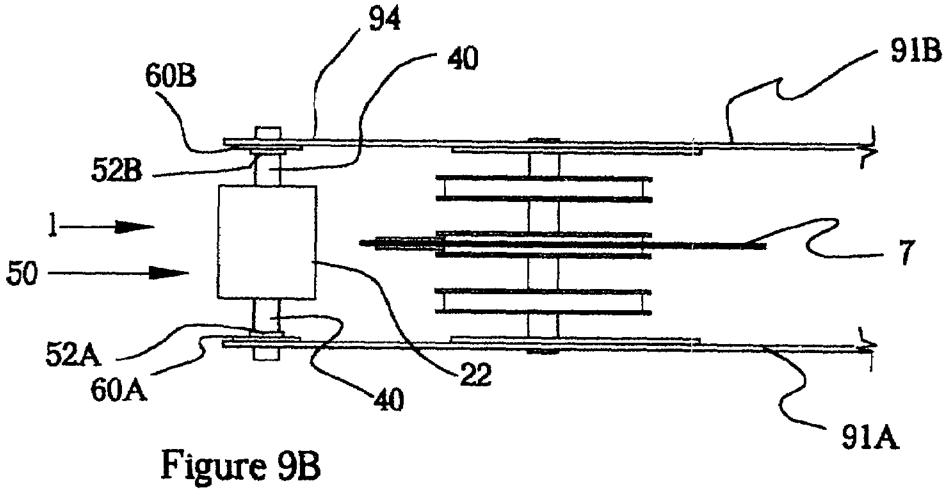
FIG. 9B illustrates a top view of the second alternative assembly of the apparatus illustrated in FIG. 9A.

As illustrated in FIG. 9B, the self-aligning apparatus 1 is positioned immediately in front of and above the tip of the boom 5 rather than to the side of the boom 5 and cable 7 as illustrated in previous examples. The rotational assemble in this example comprises two base plates 60A and 60B, each of which has an accompanying sealed bearing assembly 52A and 52B. The axle 40 passes horizontally through the upper half of the frame structure 91 (in FIG. 9A) well above the center of gravity of the complete camera unit, and the axle 40 and frame structure are connected such that the frame structure cannot rotate around the axle. One end of the axle is pressed into the bore of one sealed bearing assembly and the opposite end of the axle is pressed into the bore of the other sealed bearing assembly. Support brackets 91A and 91B are firmly attached to opposite, exterior sides of the boom 5 near the tip 94. Base plates 60A and 60B are attached securely to the boom on each side. As the angle of the boom changes, the axle rotates and the camera positioned in the frame structure rotates to maintain the vertical line-of-sight 11 as previously described.

EXAMPLE 4

This feature is common to all of the preceding examples. For operational safety of the crane, power is delivered to shutoff switches located on the boom assembly, and as required on the jib assembly. The switches prevent over elevation of the boom or jib. Commonly, electrical plug units connect a main electrical service line to the shutoff switch. Safety considerations mandates that the security of these plugs be maintained. Power to operate the camera, extendable axle, and light is also provided by the main electrical service line. To ensure security of the plug units, a locking T-splice plug is inserted between the female and male elements of the plug unit. If the camera is separately powered from the electrical system of the crane, the T-splice plug is not necessary.

That which is claimed is:

1. A mechanically extendable axle comprising the following: an outer sleeve with a longitudinal hollow core, said core of said outer sleeve having an outer surface and an inner surface wherein said inner surface has a longitudinal groove extending its length, an inner sleeve with a hollow longitudinal core and an outer surface and an inner surface, wherein said outer surface of said hollow longitudinal core of said inner sleeve has a key extending its length said key connecting said inner sleeve to said outer sleeve when said inner sleeve is inserted into said hollow longitudinal core of said outer sleeve by contact with a groove extending the length of said inner surface of said outer sleeve, said inner surface further having a distal end capable of being attached to a camera unit, said mechanically extendable axle further having a threaded axle with a distal end and a proximal end, said proximal end being coupled to the drive shaft of a reversible electric motor, and said threaded axle being supported by a nut component of a worm gear, said nut being suspended in said hollow longitudinal core of said inner sleeve and connected by support pieces connected at one or more points to said inner surface of said inner sleeve, and further said outer sleeve having a flange connecting to said reversible electric motor and to a gear assembly into which said outer sleeve is inserted and secured, said reversible electric motor is connected to the electric system of heavy equipment on which said axle is positioned and is operated by an equipment operator.

2. A vertically self-aligning camera mount apparatus comprising a rotational unit, said rotational unit comprising:

a base plate, said base plate comprising a bearing hub and a sealed bearing assembly with a bore pressed into said bearing hub;

an axle with a distal end a length, and a proximal end, said proximal end being pressed into said bore of said sealed bearing;

a camera unit comprising a box-like frame structure and a video camera removably positioned in said box-like frame structure, said box-like frame structure being attached to said proximal end of said axle at a point of rotation located on said box-like frame structure at a point above the center of gravity of said box-like frame structure when a camera is properly positioned; and a mounting means adapted to attaching said base plate to the boom of a construction crane.

3. A vertically self-aligning camera mount apparatus comprising: a rotational unit and a camera unit attached to said rotational unit, wherein said rotational unit comprises a base plate having a hub receptacle formed into said base plate and a sealed bearing assembly pressed into said hub receptacle, said sealed bearing assembly further having a bore with the proximal end of an axle pressed into said bore, and said camera unit comprising a box-like frame structure and camera enclosed in said frame structure and further wherein said box-like frame structure is attached at a rotational point to the proximal end of said axle such that as said axle rotates, said box-like frame structure is constantly self-aligned vertically with the lens element of said camera facing downward, and further wherein said base plate is adapted to being attached to a construction crane, and still further wherein said box-like frame structure is fabricated from strips of material resulting in a box-like frame structure having open front, top, bottom, and side pieces.

4. A vertically self-aligning camera mount apparatus comprising:

a freely rotating axle, said freely rotating axle having a proximal end and a distal end, wherein said proximal end of said freely rotating axle is functionally connected to a sealed bearing assembly;

a bearing hub assembly, said bearing hub assembly being physically formed in and part of a base plate, and said sealed bearing assembly with said proximal end of said freely rotating axle being functionally connected to said sealed bearing assembly being securely positioned into said bearing hub assembly, and further wherein said freely rotating axle extends at a right angle from the surface of said base plate;

a camera and a camera frame unit capable of supporting said camera, said camera frame unit comprising an open, frame-like structure, said open frame like structure comprising a point of attachment to which said distal end of said freely rotating axle is physically attached, and said point of attachment being located on the on the back piece of said camera frame unit at a point above the center of gravity of said camera frame unit when said camera is properly positioned with the lens of said camera facing vertically downward; and mechanical means, including magnets and clamps, to connect a back face of said base plate to a position near the end of the fly tip of the boom of a construction crane such that said freely rotating axle extends from the opposite surface of said base plates parallel to the horizon and the lens of said camera is vertically self-aligned with a cable element of said construction crane.

* * * * *